United States Patent [19]

Brown

[11] 4,138,521

[45] Feb. 6, 1979

[54] FLOORING MATERIALS

[75] Inventor: Robert Brown, Fife, Scotland

[73] Assignee: Nairn Floors Limited, Lancaster, England

[21] Appl. No.: 686,435

[22] Filed: May 14, 1976

Related U.S. Application Data

[63] Continuation-in-part of Ser. No. 632,039, Nov. 14, 1975, abandoned.

[51] Int. Cl.$^2$ .......................... B32B 3/30; B32B 17/02
[52] U.S. Cl. ..................................... 428/159; 428/285; 428/288; 428/290; 428/313; 428/337; 428/340; 428/904
[58] Field of Search ............... 428/158, 159, 151, 172, 428/171, 285, 288, 289, 290, 303, 313, 315, 340, 365, 401, 441, 442, 904, 337, 341; 264/54, 135, 136, 137, 321; 427/269–287, 373; 156/78, 79, 209, 220, 221

[56] References Cited

U.S. PATENT DOCUMENTS

| | | | |
|---|---|---|---|
| 3,293,094 | 12/1966 | Nairn et al. | 428/158 |
| 3,622,445 | 11/1971 | Heidweiller | 162/156 |
| 3,914,485 | 10/1975 | Curtis | 428/159 |
| 3,931,429 | 1/1976 | Austin | 428/158 |
| 3,940,536 | 2/1976 | Pitsh et al. | 428/288 |

FOREIGN PATENT DOCUMENTS 1411148  10/1975  United Kingdom .................... 428/313

Primary Examiner—Stanley S. Silverman
Attorney, Agent, or Firm—Lawrence Rosen; E. Janet Berry

[57] ABSTRACT

A substrate for a decorative cushioned vinyl floor covering, and a decorative cushioned vinyl floor covering comprising such a substrate, are described, the substrate comprising a smooth non-woven tissue having a substantially uniform thickness of from 0.13 to 0.76 mm and weighing from 30 to 150 g/m$^2$ and comprising glass fibres 5 to 15 microns in diameter, bonded with from 10 to 30%, based on the total weight of tissue, of a synthetic binder and which has at least on one surface a continuous layer of resin impregnated at least partially into that surface.

12 Claims, 5 Drawing Figures

FLOORING MATERIALS

This application is a continuation-in-part of my copending application. Ser. No. 632,039, filed Nov. 14, 1975, now abandonded.

Decorative cushioned vinyl floor coverings are now produced on a very large scale. They comprise a decorative cushioned vinyl layer carried on a substrate. The decorative cushioned vinyl layer generally comprises a layer of foamed vinyl polymer covered by a non-foamed wear resistant layer, the foamed layer or the wear resistant or both together giving a decorative effect to the product. Such products are made by spreading a layer of foamable composition over the substrate and then foaming it. This layer may be deliberately embossed or caused to foam in such a manner as to give an embossed effect but wherever it is desired that the final foamed layer should be of uniform thickness it is absolutely vital that the substrate and/or foamable layer should be of uniform thickness before foaming. For instance in a typical foaming operation the depth of the foamable layer increases fivefold upon foaming and so minor non-uniformity that is hardly visible before foaming may, after foaming fivefold, result in gross surface imperfections.

Accordingly, in practice, most methods of making decorative cushioned vinyl floor coverings involve the use of a substrate that is as flat and as smooth as possible.

Typical substrates that come into consideration are discussed on page 3 of British Patent Specification No. 1,069,998. In practice the substrate most widely used is wet laid asbestos felt, that is to say an asbestos felt formed by draining water out of a layer of a slurry of asbestos fibres and binder in water. The production and use of asbestos felt constitutes a serious health hazard and also asbestos is expensive. Despite these disadvantages no alternative substrate has gained widespread acceptance.

Numerous suggestions for alternative substrates have of course been made in the literature and some are mentioned in Brit. Specification 1,069,998. Examples of such other substrates are woven fabrics and non-woven fabrics. For instance in British Specification No. 1,206,584 a non-woven fabric of glass tissue is said to be preferred even though it is not used in the Examples of that Specification. However none of these alternative suggestions seem to have achieved wide acceptance. This is probably because woven fabrics, or even substrates based on a parallel thread construction, tend to be costly and also both woven and non-woven fabrics and tissues made by the most common methods tend to have surface irregularities which are sufficiently great as to be unacceptable as a basis for a decorative cushioned vinyl floor covering. For example a normal glass tissue will generally have an unacceptably rough surface and its thickness will generally vary from point to point to an unacceptable extent.

We have now found remarkably that it is possible to replace the conventional wet laid asbestos felt with a substrate based on a particular form of glass tissue without detrimentally affecting the stability and surface appearance of the final product but avoiding the cost and health disadvantages arising from the use of asbestos.

According to the invention a substrate for a decorative cushioned vinyl floor covering comprises a smooth non-woven tissue having a substantially uniform thickness of from 0.13 to 0.76 mm. and weighing from 30 to 150 g/m$^2$ and comprising glass fibres 5 to 15 microns in diameter bonded with from 10 to 30% by weight based on the total weight of tissue of a synthetic binder and which has at least on one surface a continuous layer of a resin impregnated at least partially into that surface. A decorative cushioned vinyl floor covering according to the invention comprises such a substrate and, on the continuous layer of resin or on one of these layers, a wear resistant decorative cushioned vinyl layer.

The invention will now be described with reference to the accompanying drawings, in which:

FIG. 1 shows a substrate 1 suitable for use as a base for a wear resistant decorative cushioned vinyl floor covering.

Figure 1:
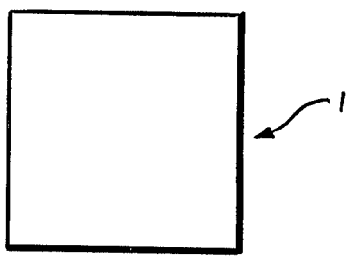
FIG. 1 is a plan view of a substrate of the present invention.
Figure 2:
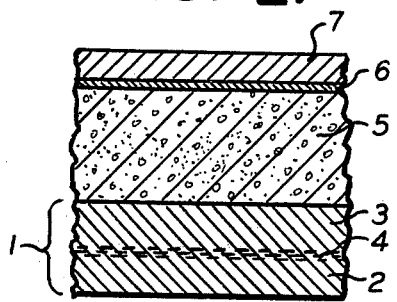
FIGS. 2 to 5 are sectional views of alternative products of the invention comprising a reinforced substrate and a cushioned vinyl layer.
Figure 3:
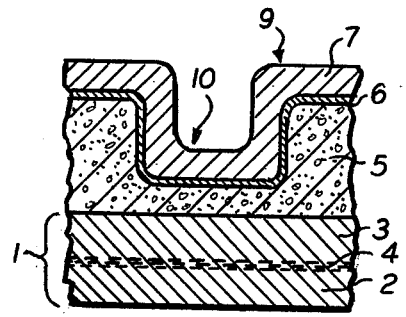
Figure 4:
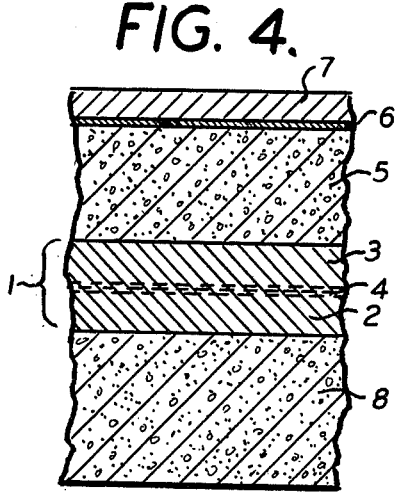
Figure 5:
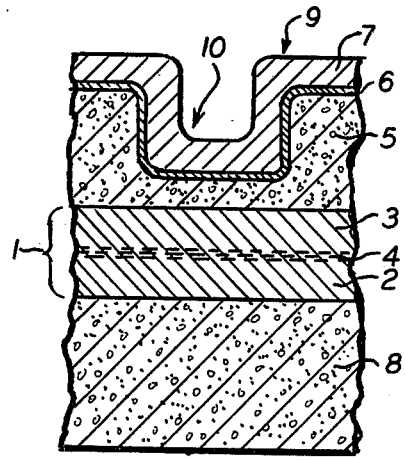

FIGS. 2 to 5 show the substrate 1 comprising continuous resinous, e.g. vinyl, layers 2 and 3 on both sides of a non-woven glass tissue 4. The tissue 4 is embedded in the resinous layers 2 and 3. FIGS. 2 to 5 further show a blown foam layer 5, a print layer 6 and a wear layer 7. FIGS. 4 and 5 additionally show a separate cellular backing layer 8. In FIGS. 3 and 5 the layer 5 has been embossed to provide a decorative pattern comprising ridges 9 and troughs 10.

The non-woven tissue usually consists solely of the synthetic binder and the glass fibres, although the fibres may be a mixture of glass fibres and synthetic staple, e.g. polyester, fibres. The amount of glass fibres should be more than 50% by weight, e.g. more than 55%, more preferably at least 70% and usually at least 80% by weight, of the fibre mixture.

The tissue must be smooth and of substantially uniform thickness in order that any surface irregularities in it are so minute that even when they are magnified as a result of foaming the foamable layer that is subsequently applied an acceptable smooth result is achieved.

One way of measuring smoothness is by using a Talysurf instrument (manufactured by Rank Taylor Hobson Ltd.). In this method, a 15 centimeter length of the material is mounted on a motorised traversing table, and a diamond tipped probe is used to follow the surface irregularities of the tissue. From a scan of the surface, variations in surface smoothness can be determined. Variations in surface smoothness are apparent in the glass fibre tissues commercially available and are often introduced by the method of manufacture of the tissue. After the tissue is coated with a continuous layer of resin the variation in surface smoothness of the glass tissue may be masked since it is often coated hot and cooled under constraint. However on heating an apparently smooth coated tissue under the conditions encountered in the manufacture of decorative cushioned vinyl floorcovering, an initially irregular glass tissue will again resume its irregular shape, causing the coated substrate to have an unacceptable undulating surface. Thus a commercially available air laid glass tissue is coated, the coatings smoothed and the coated tissue cooled down while under constraint. The variation in surface smoothness, measured by the Talysurf Instrument at this stage is ± 0.04 mm. The coated tissue is then re-heated under the conditions to be encountered in manufacture of a cushioned vinyl floorcovering and cooled down in contact with a smooth glass plate i.e.

without constraint on the tissue. The variation in surface smoothness of the reheated substrate measured as before is now ± 0.12 mm.

In the invention, the variation in smoothness of the coated tissue measured in this manner is preferably less than ± 0.06 mm. and more preferably less than ± 0.03 mm. at least on the surface that is to carry the decorative cushioned vinyl layer.

When one holds up to the light many normal glass tissues one can see variations in thickness and/or density and such tissues are not of substantially uniform thickness. In the invention it is preferred that the thickness of the tissue should at all places be within ± 15%, and preferably ± 10% of the chosen thickness and it is also preferred that the weight per unit area of the tissue should in all places be within ± 15% and preferably within ± 10% of the chosen weight. It is particularly preferred that the thickness in all places should be within ± 5% of the chosen thickness and the weight should be within ± 5% of the chosen weight, and in particular the weight should be within ± 2% of the chosen values. Preferably variations in weight are not more than ± 3, and preferably not more than ± 1 g/m$^2$ and preferably the variations in thickness are not more than ± 0.02 mm.

The weight of the tissue is preferably from 30 to 100 g/m$^2$ and preferably it is from 0.25 to 0.5 mm thick. The amount of resin composition applied to it to form the continuous layer on either or both of its surfaces is normally within the range 300 to 1000 g/m$^2$.

Particularly good results are obtained in the invention when the tissue weighs from 50 to 60 g/m$^2$ and carries from 15 to 20% binder. These and other particularly preferred tissues are made by a wet laying technique, whereas many glass fibre tissues are made by an air laying technique.

The glass fibres from which the tissue is formed preferably have a diameter of 10 to 13 microns. The fibres may be continuous fibres that have been broken into lengths of several centimeters or relatively short fibres, e.g. of 2 centimeters or less.

The preferred tissues of the invention having the optimum smoothness, weights, deviations, fibre diameters and binder contents are commercially available although most glass tissues commercially available do not have these properties.

The binders used in the tissue may be conventional, for instance they may be based on acrylic resins, polyvinyl alcohol or urea formaldehyde resins.

The substrate must include the prescribed continuous layer of resin on at least one surface, namely the surface that is to carry the decorative cushioned layer. The resin is generally a vinyl chloride resin. The layer may be a preformed layer that is calendered onto the tissue or it may be formed on the tissue from a plastisol. If it is formed from a plastisol then this plastisol may be spread as a layer direct onto the tissue or may be spread first on a release paper, the tissue then being embedded in the layer of plastisol. Either way the plastisol is then gelled. However the layer is formed it must at least partially impregnate the surface on which it is applied in order that it bonds securely to the tissue and normally the tissue will be wholly impregnated with resinous material, this material either extending all the way through from a continuous layer on one surface or resinous material from continuous layers on each surface merging with one another within the thickness of the tissue. Instead of applying all the resin of the layer in one application to the tissue, the layer can be made up of two layers, namely an upper layer (generally of a vinyl chloride resin) and a lower sizing layer that has been applied previously. The resin of the lower layer is often also of a vinyl chloride plastisol although acrylic and butadiene-styrene resins are also very suitable. Any latex that is conventional used to impregnated felts can also be used, e.g. butadiene-acrylonitrile copolymers, chloroprene and similar synthetic rubbers, natural rubber latex, polymers based on acrylic or methacrylic acid or heir esters, PVC latices or PVDC. These may be used alone or in combination with a filler such as calcium carbonate or whiting. The amount of filler is typically from 0 to 200, e.g. 50 to 150, parts by weight per 100 parts of the latex.

When, as is often preferred, there is a continuous layer on each surface it is generally preferred that at least one of the layers should contain up to 500, e.g. 150 to 400 g/m$^2$, of resin composition. Both layers may have this order of resin coating, or if a size layer is used then this may be sufficient as a coating over that side of the tissue opposite from that on which the upper layer is coated.

One preferred method of forming the substrate from the tissue comprises coating the glass tissue first on one side with from 100 to 700, preferably 300 to 500, g/m$^2$ of a polyvinyl chloride plastisol having a viscosity of 250 to 350 poise and comprising 100 parts PVC, 50 to 100 parts plasticiser and 0 to 10 parts diluent. Conditions of application, which may conveniently be by a knife on roller, or knife on jacket coater, should be such that only partial penetration of the tissue, i.e. 20 to 80% of the depth, and preferably 50% of the depth, occurs. The coated tissue is then cured by passing it either around a heated drum or through a hot air oven at 150° to 200° C. The reverse side of the coated material is then coated with a plastisol of sufficient mobility to penetrate the tissue sufficiently to contact the previously applied coating through the tissue. The amount of this coating is generally from 100 to 500 g/m$^2$, preferably 200 to 400 g/m$^2$. The plastisol may be of the same general formulation as given above but often it is preferred that it should be slightly less viscous, for instance having a viscosity of 150 to 250 poise.

Another method of applying the continuous layers involves coating a plastisol having a viscosity of 150 to 250 poise and of the general formulation given above onto a releasing substrate to form a layer of 100 to 500, preferably 200 to 400 g/m$^2$. The glass tissue is laid into the wet plastisol and the assembly cured by passage through a hot air oven at 150° to 200° C. A plastisol coat, for example of a plastisol having a viscosity of 100 to 200 poise, is then applied at a weight of 100 to 400, preferably 150 to 300 g/m$^2$, to the opposite surface of the tissue and is then cured.

In each of these methods, if desired, the second coat can be applied to the tissue by a tandem coating technique before the first coating has been dried and cured.

In another method, instead of either, but usually instead of the first, plastisol coating the tissue is calender coated with a film of 200 to 600 and preferably 300 to 500 g/m$^2$ of a vinyl chloride composition, usually at a temperature of 150° to 200° C.

In any of these coating operations it may in some instances be desirable to improve the smoothness of the surface layer by passing it through a facing nip.

Alternatively, the tissue may be sized on one side with, for example, an acrylic latex so that the final weight of coating is from 50 to 500, more preferably 80 to 300, e.g. 170 g/m². This may be achieved by using a composition containing 100 parts of the polymer and 70 parts of whiting. The acrylic resin will usually be of a consistency such that it will fill the tissue interstices and strike through the tissue so that the thickness of the resin coating will be approximately equal on each side. At least one of the size layers will then have an upper layer applied over it by any of the methods described above. Using two resins in this way ensures that the tissue is sufficiently encapsulated so that there are no loose or free glass fibres, and that the tissue is well impregnated with a resin which is sufficiently porous not to cause problems when the second resin layer is applied. The second resin coating will usually be of from 150 to 500, e.g. 400 g/m². This gives the substrate the desired thickness and weight.

From economic reasons it is preferred that a vinyl chloride resin is used as the major resin component in the substrate of the invention. However, if a greater amount of, for example, an acrylic latex is used to impregnate the tissue then this may give sufficient stability and thickness to the system so that it can be used directly for the building up of a cushioned vinyl floor covering.

In all these methods, the final substrate can easily be made to have a smoothness, as measured by the Bendsten surface smoothness tester using an overpressure of 150 mm water gauge, of 500 ml/min. and below, for instance below 400 ml/min. This compares very favourably with conventional asbestos felts which are in fact often rougher than this. For instance a typical coated felt at present being used commercially has a smoothness of 600 ml/min. by this test. The Bendsten surface smoothness tester is manufactured by H. E. Mesmer.

The coated substrate normally weighs from 300 to 1200 g/m², preferably 600 to 1000 g/m². For example, the substrate may comprise 50 g/m² of a bonded tissue (of which 40 g/m² are glass fibres and 10 g/m² are polyvinyl alcohol), 170 g/m² of an acrylic latex which impregnates the tissue and covers all the fibres at least partially, and 400 g/m² of a layer of a polyvinyl chloride plastisol, the whole being 0.025 inches thick.

A decorative cushioned vinyl surface can be of uniform thickness, the decoration then being due to it having a uniform or patterned colour, but preferably it also has a profiled structure. Such a structure may be made by, for example, printing differing amounts of foamable composition, and optionally also non-foamable composition and then heating the printed product to cause foaming and to gel the composition, for example as described in U.S. Pat. No. 2,920,977. In another method a foamable composition may be applied uniformly and material printed onto it, or printed initially underneath it, to cause preferential foaming either in the printed or in the non-printed areas upon subsequent heating, for example as described in British Patent Specification No. 1,059,998. A wearlayer may be applied before or after foaming. The wear layer may be transparent, and thus a multi-coloured pattern printed in or on the foamable layer before or after foaming, or on a uniform non-foamed layer over that foamable layer, will be visible through the wearlayer.

Throughout this Specification all reference to vinyl chloride polymers and PVC are intended to embrace not only polyvinyl chloride homopolymer but also copolymers of vinyl chloride with, for instance, vinyl acetate. All viscosities are measured by a Brookfield viscometer HAT model using spindle number 6 at 20 r.p.m. and at 25° C.

If desired a foamable layer can be applied also to the backing of the substrate so as to give a resilient underlay. This is shown in FIGS. 4 and 5, but if the tissue has been coated with a resin which has been allowed to strike through the fibrous structure, the thickness of the coating on the opposite side from that on which the cushioned vinyl layer is built up may be sufficient to support such a backing foamable layer.

In the following Examples in every instance the glass fibre tissue used was that which is supplied by Glaswerk Schuller GmbH under their designation OR5ON. This weighs 51 g/m² and 19% of this weight is urea formaldehyde resin which is impregnated into the tissue, the remainder being glass fibres which are about 13 microns in diameter. The tissue is a wet laid tissue having a variation in weight over 30 samples of 100 cm² each of about ± 2.2 g/m². The tissue is 0.46 mm thick as measured by the WIRA Carpet Thickness Tester under the conditions as laid down by BS 4051:1972, but only using one sample for each measurement, with a range in thickness measured at 25 places along a 30 meter roll, of ± 0.02 mm. In the following Examples the first resin coating and the decorative foamable layer are always applied onto the smoother of the surfaces.

EXAMPLE 1

The glass fibre tissue is coated by a knife on a roller coater, with Plastisol A, applied at 500 g/m².

| Plastisol A | Parts |
| --- | --- |
| PVC | 100 |
| Dioctyl phthalate | 100 |
| Whiting | 190 |
| TiO₂ | 10 |
| Thiotin heat stabiliser | 1 |

Viscosity of the plastisol, as measured at 25° C. with a Brookfield HAT model viscometer, using spindle number 6 at 20 r.p.m., is 295 poise.

(Although a variety of PVC resins may be used, in a preferred Example 67 parts Vestolit E8001 and 33 parts Vinnol H65V PVC resins are used, these being supplied by Chemische Werke Huls AG and Wacker-Chemie GmbH respectively.)

The coated glass tissue is then cured by passage through an air circulation oven, situated immediately after the knife and roller coater, at 180° C. with a dwell time of 150 seconds, and, after leaving the oven, is "faced" by passage through a smooth rollered nip, before being rolled up.

The material is then taken to the front of the coating line and re-coated on the second side by a knife on roller coater with Plastisol B, applied at 300 g/m².

| Plastisol B | Parts |
| --- | --- |
| PVC (e.g. as in Plastisol A) | 100 |
| Dioctyl phthalate | 90 |
| Whiting | 190 |
| TiO₂ | 10 |
| Thiotin heat stabiliser | 1 |
| Viscosity depressant (e.g. Nopco 5221/L) | 5 |
| White spirit | 8 |

Viscosity of the plastisol, measured as Plastisol A, is 240 poise ("Nopco" is a Trade Mark of the Diamond Shamrock Chemical Co.)

The second coat of PVC plastisol is cured by passage through an air circulation oven in the same manner as the first coat, is "faced" and finally rolled up to give a substrate weighing about 850 g/m² and having a smoothness of 350–360 Bendsten units.

EXAMPLE 2

A release paper (for example Multikast type 446, supplied by Wiggins Teape) is coated by knife on roller coater with Plastisol C, applied at 400 g/m².

| Plastisol C | Parts |
| --- | --- |
| PVC (e.g. as in Plastisol A) | 100 |
| Dioctyl phthalate | 67 |
| Whiting | 125 |
| TiO₂ | 25 |
| Thiotin heat stabiliser | 1 |
| Viscosity Depressant | 5 |
| White Spirit | 8 |

Viscosity of the plastisol, measured at 25° C. with a Brookfield HAT model viscometer, using spindle number 6 at 20 r.p.m., is 295 poise.

Immediately after the coater, the glass tissue is laid into the wet coating using a laminating roll working at low pressure to press the glass tissue into intimate contact with the wet coating.

The laminate is then passed through an air circulation oven at 180° C. for 150 seconds in order to cure the plastisol, faced whilst still hot by passage through a smooth rollered nip and rolled up, when cool, prior to further processing into a floor covering or other surface covering material, whilst still attached to the release paper.

EXAMPLE 3

As an extension of method of manufacture of Example 2, a further coat of Plastisol D, application weight 200 g/m², is applied to the glass tissue side of the cured laminate by knife on roller coating, the plastisol being cured in an air circulation oven at 180° C. for 150 seconds and then faced while still hot by passage through a hot smooth rollered nip.

| Plastisol D | Parts |
| --- | --- |
| PVC | 100 |
| Dioctyl phthalate | 70 |
| Whiting | 90 |
| TiO₂ | 10 |
| Thiotin heat stabiliser | 1 |
| Nopco 5221/L | 5 |
| White Spirit | 8 |

Viscosity of the plastisol measured as quoted in Example 2, is 150 poise. (The PVC may be 60 parts Quirvil 268 and 40 parts Corvic XP60/68 from Rumianca SpA and I.C.I. respectively.)

After being cooled, the glass tissue reinforced vinyl layer is removed from the release paper substrate prior to further processing.

EXAMPLE 4

The glass tissue is calender coated with the following formulation, at 400 g/m².

| | Parts |
| --- | --- |
| PVC | 100 |
| Dioctyl phthalate | 33 |
| Ground limestone | 125 |
| TiO₂ | 12 |
| Ba/Cd liquid stabiliser | 3 |
| Hydrogenated castor oil | 1.5 |
| Stearic Acid | 1 |
| (The PVC may be Scon 5300, from Vinyl Products.) | |

Calender roll temperatures of 170° C. to 180° C. are used.

The coated glass tissue is re-coated on the glass side, by Plastisol D, applied at 300 g/m² by knife on roller coater. Following coating, the composite is cured by passage through an air circulation oven at 180° C. with a dwell time of 150 seconds, faced whilst hot by passage through a smooth rollered nip, cooled down and rolled up prior to use in further processes.

EXAMPLE 5

The reinforced vinyl layer from Example 1 is coated on the side initially coated with 500 g/m² Plastisol A, by reverse roll coater with 200 g/m² of a chemically foamable PVC plastisol such as any of the foamable compositions described in British Patent Specification No. 1,069,998.

The viscosity of the plastisol, measured with a Brookfield HAT model viscometer at 25° C., using a number 6 spindle at 20 r.p.m., is 20 poise.

The coating is fused at 160° C., a temperature at which the coating can be gelled without decomposing the blowing agent, by passage through an air circulation oven.

The coated material is printed using solvent based inks on a gravure printing press, some of the inks optionally containing an inhibiting agent for the foaming reaction (following the teaching of British Pat. No. 1,069,998/9) if texture is required in the end product.

The printing material is then overcoated by reverse roll coater using a plastisol, which cures to a hard transparent wear layer film, giving protection to the print layer in the finished product.

The viscosity of this plastisol, measured as quoted in Example 1, is 20 poise. The application weight is 160 g/m².

After application of this plastisol, the material is passed through an air circulation oven at 200° C. to cure the coating and to cause foaming to occur. After leaving the hot air circulation oven, the material is cooled down before being rolled up. The finished product weighed approximately 1200 g/m² and had a thickness, in non-debossed areas, of 0.045 inches.

I claim:

1. A substrate for a decorative cushioned vinyl floor covering comprising a smooth non-woven tissue having a substantially uniform thickness of from 0.13 to 0.76 mm and weighing from 30 to 150 g/m² and consisting essentially of glass fibres 5 to 15 microns in diameter, bonded with from 10 to 30%, based on the total weight of tissue, of a synthetic binder and which has at least on one surface a continuous layer of vinyl resin impregnated at least partially into that surface, wherein the coated tissue has a smoothness of less than ± 0.06 mm after heating and cooling without constraint and has thickness and weight deviations of ± 10%.

2. A substrate according to claim 1 in which the thickness and weight deviations are ± 5%.

3. A substrate according to claim 2 in which the deviation in weight is within ± 2%.

4. A substrate according to claim 1 in which the tissue weighs 30 to 100 g/m² and is from 0.25 to 0.5 mm thick and the total amount of resin on its surface or surfaces and impregnated into it is from 300 to 1000 g/m².

5. A substrate according to claim 1 in which the glass fibres are 10 to 13 microns in diameter.

6. A substrate according to claim 1 in which the tissue weighs from 50 to 60 g/m² and contains from 15 to 20% binder.

7. A substrate according to claim 1 in which the tissue is a wet laid tissue.

8. A substrate according to claim 1 in which a continuous layer of resin is impregnated at least partially into each surface of the tissue.

9. A substrate according to claim 8 in which there is a continuous layer of from 150 to 400 g/m² of vinyl chloride resin on one or on both surfaces.

10. A decorative cushioned vinyl floor covering comprising a substrate according to claim 1 and a wear resistant decorative cushioned vinyl layer on the continuous layer of resin or one of the continuous layers of resin on the substrate, said decorative cushioned vinyl layer comprising a layer of foamed vinyl polymer covered by a non-foamed, wear-resistant layer.

11. Floor covering according to claim 10 in which the foamed layer is embossed.

12. Floor covering according to claim 10 in which the surface of the substrate opposite the decorative cushioned vinyl layer is bonded to a foamed backing layer.

* * * * *